(12) United States Patent
Hsieh et al.

(10) Patent No.: US 8,369,026 B2
(45) Date of Patent: Feb. 5, 2013

(54) NON-SPHERICAL LENS MODULE FOR EASY MANUFACTORY

(75) Inventors: Wen-Yi Hsieh, Tu-Cheng (TW); Yen-Chih Chang, Tu-Cheng (TW)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 13 days.

(21) Appl. No.: 12/980,369

(22) Filed: Dec. 29, 2010

(65) Prior Publication Data
US 2011/0157723 A1 Jun. 30, 2011

(30) Foreign Application Priority Data
Dec. 31, 2009 (TW) .................................. 98146116

(51) Int. Cl.
*G02B 13/20* (2006.01)
*G02B 3/02* (2006.01)
*G02B 3/08* (2006.01)
*B29D 11/00* (2006.01)

(52) U.S. Cl. ........ 359/707; 359/717; 359/741; 359/900; 264/1.26

(58) Field of Classification Search .................. 359/717, 359/708, 741, 796, 900; 264/1.24, 1.25, 264/1.26, 1.31, 1.32
See application file for complete search history.

(56) References Cited

U.S. PATENT DOCUMENTS
2006/0215982 A1 9/2006 Umezawa
2011/0063730 A1* 3/2011 Shyu et al. .................... 359/619

FOREIGN PATENT DOCUMENTS
JP 2007-171775 7/2007

* cited by examiner

*Primary Examiner* — Jack Dinh
(74) *Attorney, Agent, or Firm* — Wei Te Chung; Ming Chieh Chang

(57) ABSTRACT

A manufacture method of a non-spherical lens module includes: firstly, forming a housing having a row of through holes running through a first surface and a second surface thereof; secondly, providing and filling liquid waveguide with the through holes and forming two convex portions at jointing positions of the through holes and said two surfaces respectively; lastly, cooling the liquid waveguide to form the waveguide in the through hole, cooling the two convex portions to form first and second lens portions.

17 Claims, 5 Drawing Sheets

NON-SPHERICAL LENS MODULE FOR EASY MANUFACTORY

BACKGROUND OF THE INVENTION

1. Field of the Invention

The present invention generally relates to a non-spherical lens module, and more particularly, to a novel structure of a non-spherical lens module for easy manufactory and achieving cost-down purpose.

2. Description of Related Art

Signal transmitting by cables has been widely applied in industry. Now there is a new technology of signal transmitting by optical-fiber for speeding up signal transmission. Therefore, many companies all develop optical-fiber transmission technology. In particularly, the Intel Company has released Light Peak Technology on internet which includes a connector with an optical-fiber at back of the connector. Signal is transmitted by the optical-fiber to other connector. Our company intends to design an optical-fiber connector for easy manufactory and achieving cost-down purpose. Our company also design a lens module used in conjunction with the optical-fiber. Thus, a lens module for easy manufactory is desired to achieve cost-down purpose.

Hence, the present invention is directed to solving this problem in the related art.

SUMMARY OF THE INVENTION

An object of the invention is to provide a non-spherical lens module for easy manufactory and achieving cost-down purpose.

In order to achieve the object set forth, a manufacture method of a non-spherical lens module comprises: firstly, forming a housing having a row of through holes running through a first surface and a second surface thereof; secondly, providing and filling liquid waveguide with the through holes and forming two convex portions at jointing positions of the through holes and said two surfaces respectively; lastly, cooling the liquid waveguide to form the waveguide in the through hole, cooling the two convex portions to form first and second lens portions.

Other objects, advantages and novel features of the invention will become more apparent from the following detailed description when taken in conjunction with the accompanying drawings.

DETAILED DESCRIPTION OF THE INVENTION

Reference will now be made in detail to the preferred embodiment of the present invention.

Figure 1:
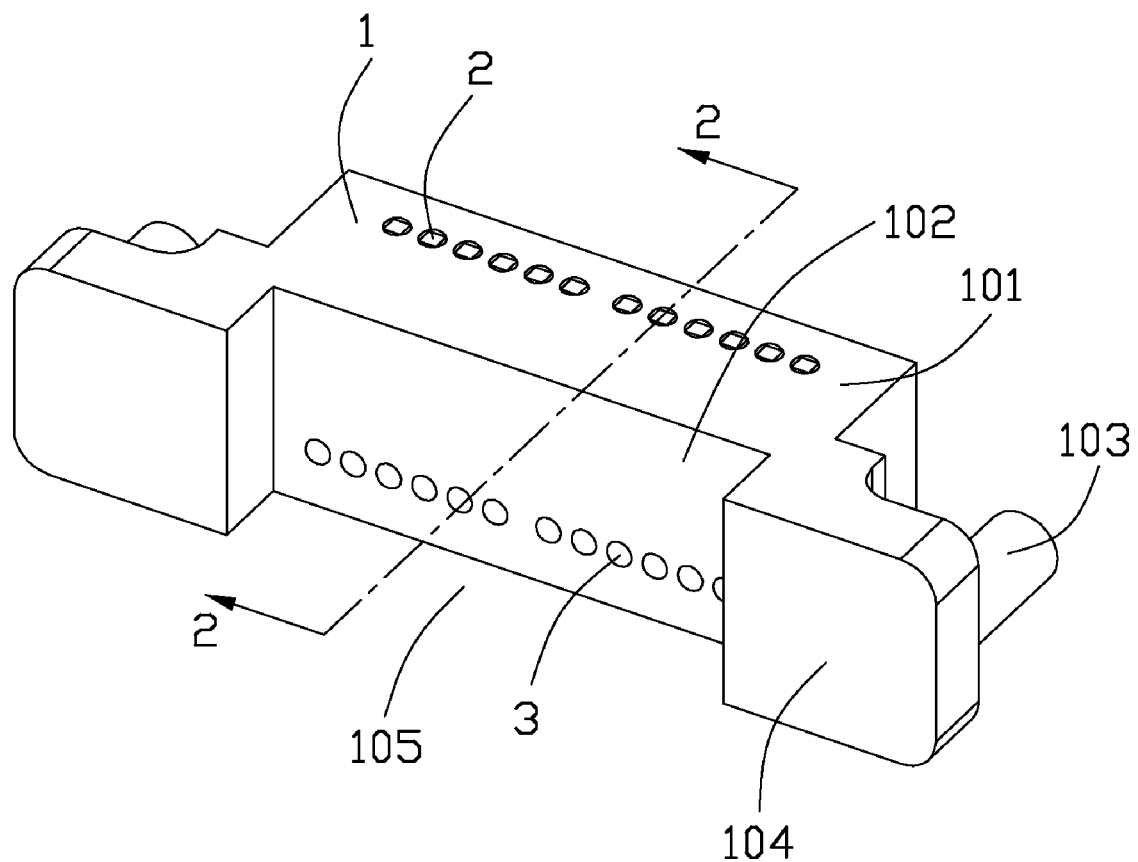
FIG. 1 is a perspective view of a non-spherical lens module of the present invention.
Figure 2:
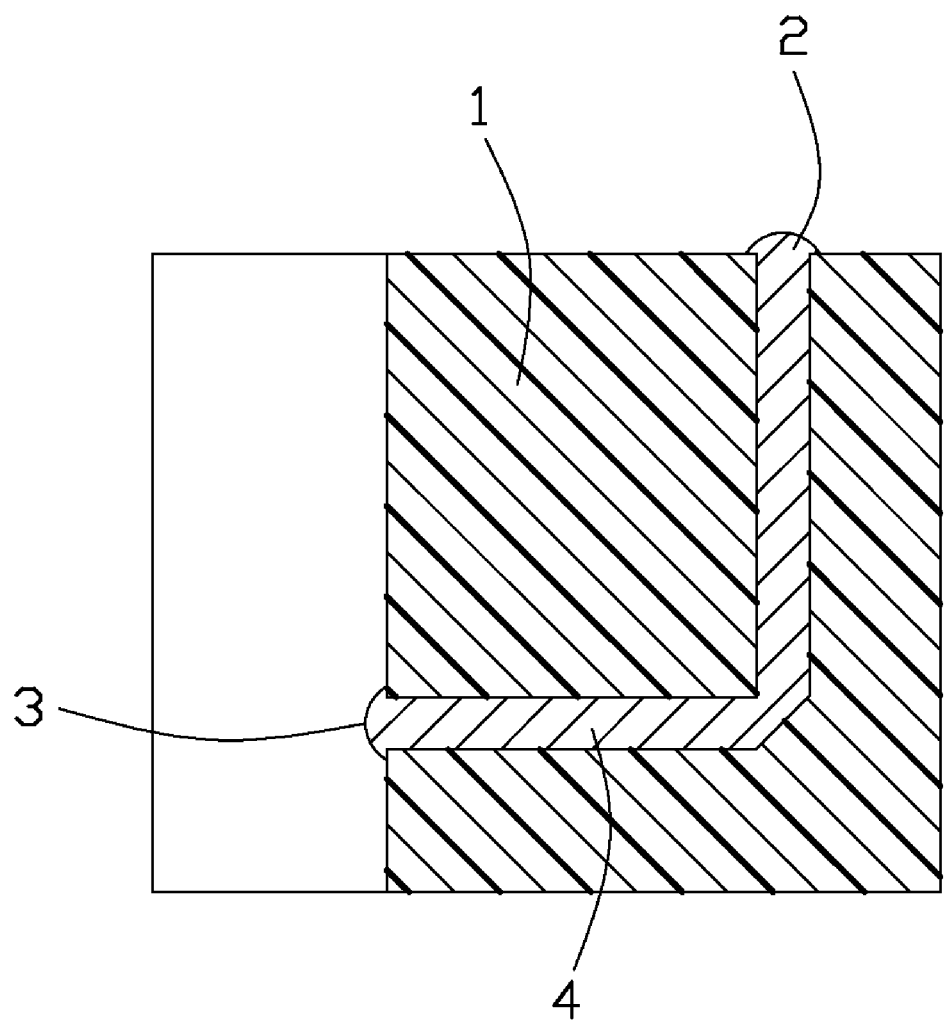
FIG. 2 is a cross-sectional view of the non-spherical lens module taken along lines 2-2 in FIG. 1.
Figure 3:
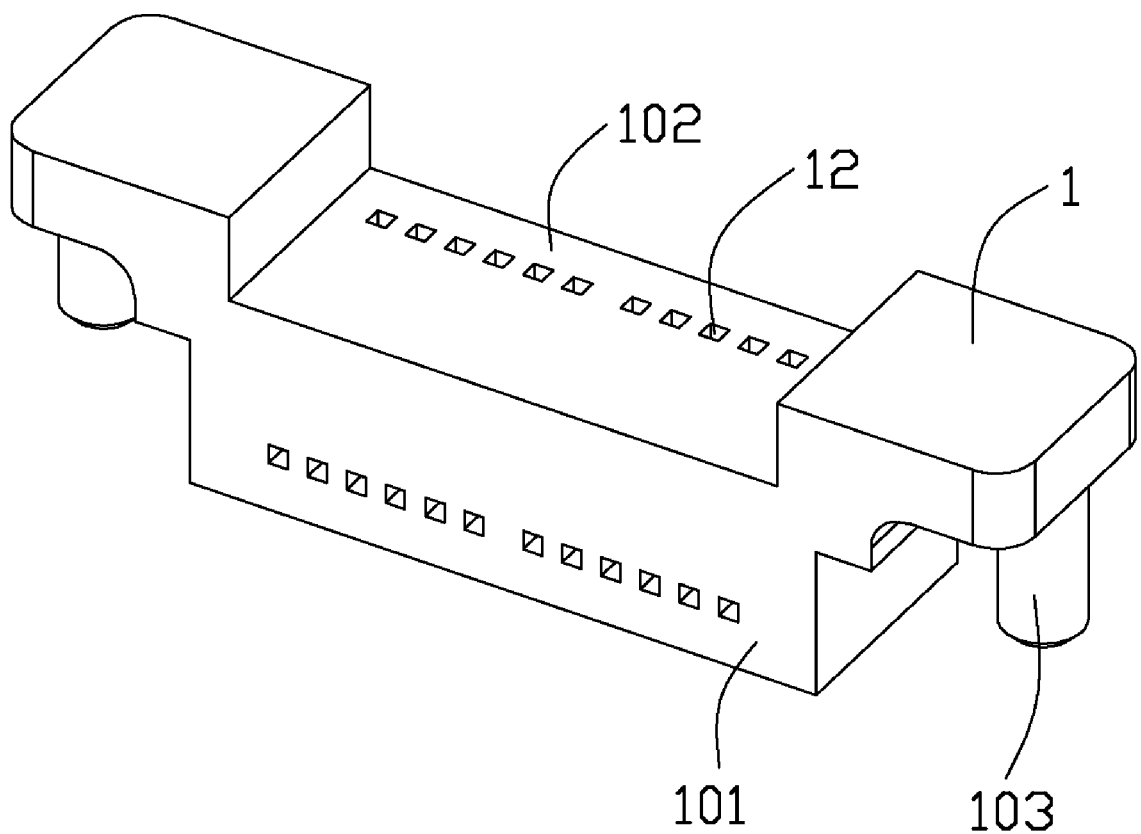
FIG. 3 is a perspective view of a housing of the non-spherical lens module of the present invention.

Referring to FIGS. 1 and 2, a non-spherical lens module includes a rectangular housing 1, a set of first non-spherical lenses 2 defined on a top surface 101 of the housing 1 and a set of second non-spherical lenses 3 on a back surface 102 of the housing 1. A waveguide 4 connects with the first and second lens 2, 3 in the housing 1 (refer to FIG. 2). The set of first lenses 2 is used to couple with a complementary lens module (not shown), and the set of second lenses is used to couple with optical-fibers or waveguide slots in a circuit board (not shown). The optical lines are received and emitted through the non-spherical lens module to transmit signals. In the embodiment, the waveguide 4 is right-angle. Alternatively, the waveguide also can be liner shape, when the second lens is defined on a bottom surface of the housing 1, the bottom surface is parallel to the top surface. A pair of end portions 104 extends rearward from two sides of the back surface 102. A recess 105 is surrounded by the two end portions 104 and the back surface 102 where the set of second lens 3 are disposed, which is adapted for protecting assembling of the non-spherical lens module and the circuit board. A pair of posts 103 respectively extends forwardly from the pair of end portions 104 opposite to the back surface 102. The pair of posts 103 is defined at the two sides of the housing 1. The post 103 and the end portion 104 both extend in parallel to the top surface 101. The post 103 is helpful to assemble the non-spherical lens module to the complementary lens module.

A manufacture method of the non-spherical lens module of the present invention is illustrated below. Firstly, the housing 1 is formed by injection molding or other manufacture method, the housing has one or more rows of the through holes 12 running through the top surface 101 and the back surface 102 thereof. The top surface 101 is perpendicular to the back surface 102, the through hole 12 is right-angle. Secondly, provided melted liquid waveguide material and injection the melted material into the through holes 12 until the through holes fully filled with the waveguide material and two convex portions 21 above jointing positions of the through holes and said two surfaces 101, 102 respectively. Lastly, cooling the liquid waveguide material to form the waveguide 4 in the through hole 12, the two convex portions 21 is cooled to form said first and second lens portions 2, 3. The material of the housing 1 is cheaper than the waveguide's 4, because the housing 1 doesn't transmit the optical signal. It can save cost compared with the related art. The convex portion 21 needs to form special shape by assistant tools.

Figure 4:
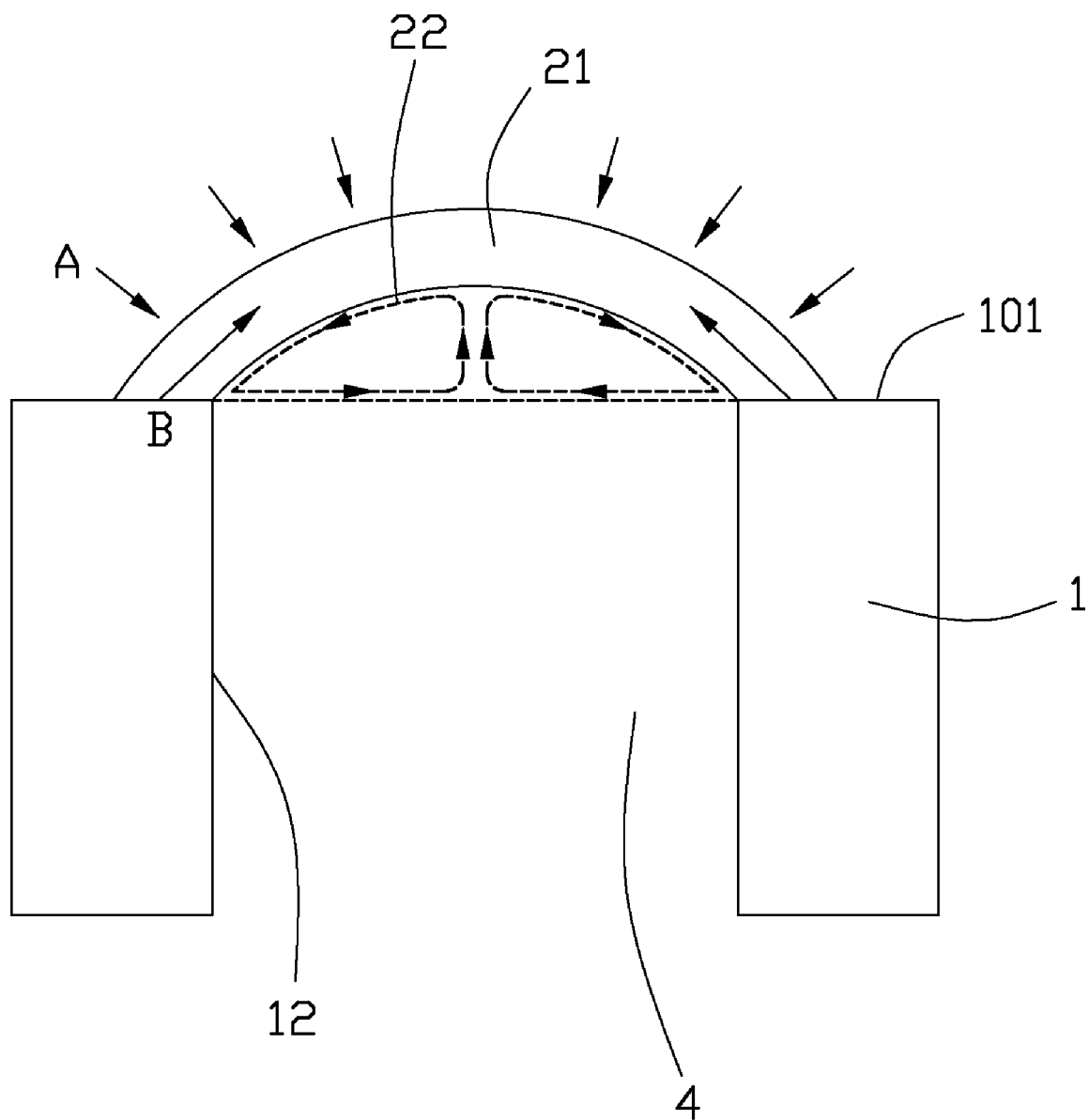
FIG. 4 is a schematic view illustrating a wok principle forming the lens portion of the non-spherical lens module.
Figure 5:
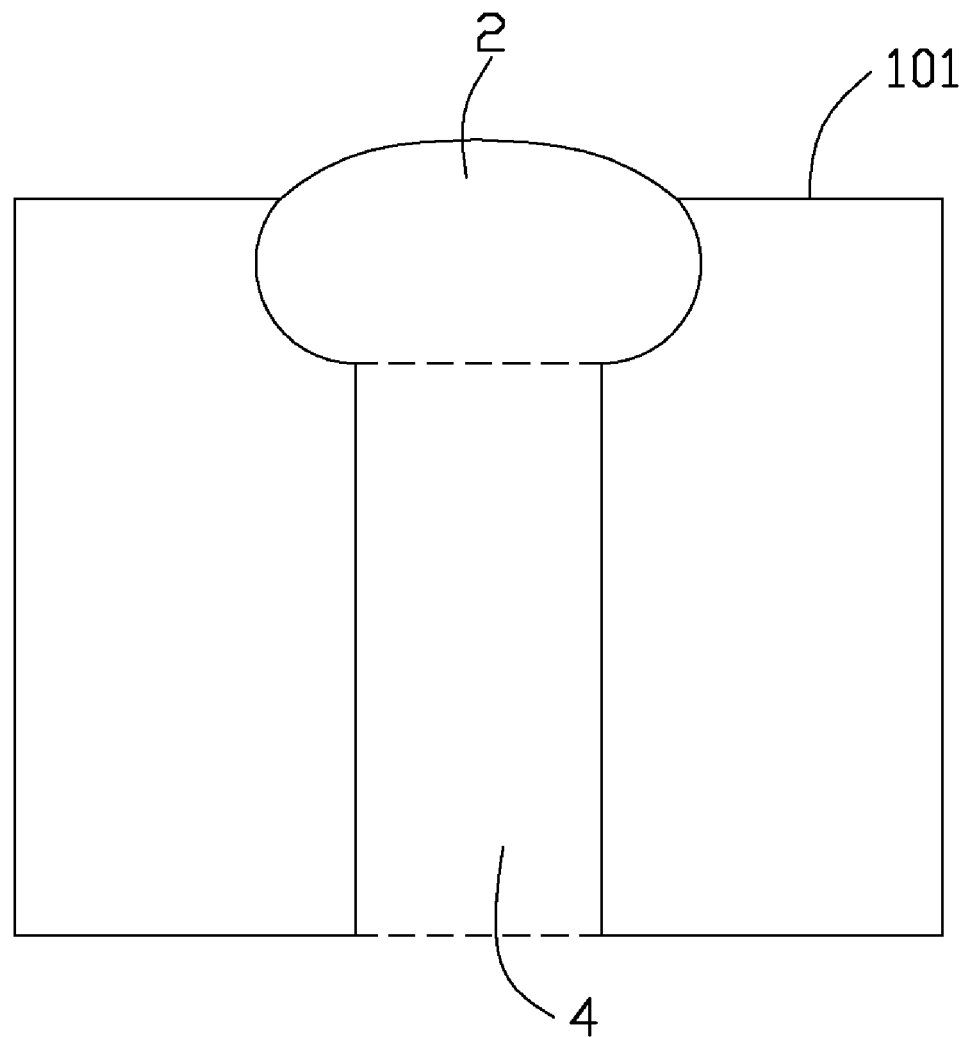
FIG. 5 is a schematic view illustrating a work principle forming a lens portion of the non-spherical lens module of a second embodiment of the present invention.

A forming principle of the first and second lens portions 2, 3 by force cohesive of liquid include is illustrated in FIG. 4. The convex portion 21 is formed by surface tension of liquid, the convex portion connects with side surface of the through hole 12 and forms two vortex flow 22 thereunder. The flow force of the liquid in the vortex flow 22 is equal to force of which pressure (refer to Arrow A) and the side surface of the through hole 12 exert on the liquid (refer to Arrow B). Refer to FIG. 5, one end of the through hole 12 adjacent to the top surface 101 are changed to form a different shaped first lens portion, e.g., the end is enlarged to form a first lens portion 12 with a flat surface; or the end is reduced to form a first lens portion 12 with larger radian. The manufacture of second lens portion 13 is same as the first lens portion 12. Thus, the first and second lens portions are easy to manufacture without any assistant tools.

It is to be understood, however, that even though numerous, characteristics and advantages of the present invention have been set fourth in the foregoing description, together with details of the structure and function of the invention, the disclosed is illustrative only, and changes may be made in detail, especially in matters of number, shape, size, and arrangement of parts within the principles of the invention to the full extent indicated by the broad general meaning of the terms in which the appended claims are expressed.

What is claimed is:

1. A manufacture method of a non-spherical lens module, comprising:

firstly, forming a housing having a row of through holes unitarily running through a first surface and a second surface of the housing;

secondly, providing liquid waveguide material and inject the liquid waveguide material into the through holes until the through holes fully filled with the waveguide material and two convex portions at jointing positions of the through holes and said two surfaces respectively;

lastly, cooling the liquid waveguide to form the waveguide in the through hole, and the two convex portions to form first and second lens portions; wherein the waveguide is integrally formed with the housing without possibility of dropping.

2. The manufacture method of a non-spherical lens module as claimed in claim 1, wherein said first surface is perpendicular to the second surface, the waveguides in the through holes are right-angle.

3. The manufacture method of a non-spherical lens module as claimed in claim 2, wherein a pair of end portions extends from two sides of the second surface in parallel to the first surface direction, a recess is surrounded with two end portions and the second surface.

4. The manufacture method of a non-spherical lens module as claimed in claim 3, wherein a pair of posts is defined at the pair of end portions respectively opposite to the second surface.

5. The manufacture method of a non-spherical lens module as claimed in claim 2, wherein the first surface is located above the second surface and the liquid waveguide material is injected from the first surface.

6. The manufacture method of a non-spherical lens module as claimed in claim 1, wherein said two ends of the through hole adjacent to the first and second surface are enlarged or reduced.

7. The manufacture method of a non-spherical lens module as claimed in claim 1, wherein said two convex portions are bulged upon said two surfaces via surface tension, respectively.

8. A non-spherical lens module, comprising:

a one piece housing having a first surface and a second surface different from the first surface;

a first lens portion integrally defined on the first surface of the housing;

a second lens portion integrally defined on the second surface of the housing;

a waveguide connecting with the first and second lens portions via a through hole in the housing;

wherein the first, second lens portions and the waveguide are formed in one piece with same material which is different from the housing's material.

9. The non-spherical lens module as claimed in claim 8, wherein said first surface is perpendicular to the second surface, the waveguide in the through hole is right-angle.

10. The non-spherical lens module as claimed in claim 9, wherein said a pair of end portions extends from two sides of the second surface in parallel to the first surface direction, a recess is surrounded with two end portions and the second surface.

11. The non-spherical lens module as claimed in claim 8, wherein said two ends of the through hole adjacent to the first and second surface are enlarged or reduced.

12. A non-spherical lens module comprising:

a one piece housing defining a through hole extending through different first and second surfaces of the housing with first and second openings; and a liquid type waveguide forcibly filled into the through hole and successively solidifying to unitarily form non-spherical lenses at said first and second openings, respectively; wherein each of the non-spherical lenses defines a diameter larger than that of the through hole in the corresponding surface and is permanently integrally formed with the housing.

13. The non-spherical lens module as claimed in claim 12, wherein the through hole is enlarged around one of the first and second surfaces.

14. The non-spherical lens module as claimed in claim 12, wherein the through hole defines an angled configuration.

15. The non-spherical lens module as claimed in claim 12, wherein said liquid type waveguide is injected into the through hole via one of said first and said second openings.

16. The non-spherical lens module as claimed in claim 12, wherein the first surface and the second surface are perpendicular to each other.

17. The non-spherical lens modules as claimed in claim 12, wherein the non spherical lens defined a contour similar to a liquid surface derived from surface tension.

* * * * *